United States Patent [19]

Gray et al.

[11] 4,250,452

[45] Feb. 10, 1981

[54] PRESSURE SENSITIVE TRANSDUCER CIRCUITS

[75] Inventors: Randall C. Gray, Scottsdale; W. David Pace, Tempe, both of Ariz.

[73] Assignee: Motorola, Inc., Schaumburg, Ill.

[21] Appl. No.: 31,884

[22] Filed: Apr. 19, 1979

[51] Int. Cl.³ .................. H03K 3/26; G01N 27/00
[52] U.S. Cl. ................................ 328/1; 307/118; 307/308; 307/254; 328/5
[58] Field of Search ............. 328/1, 5; 307/308, 254, 307/116, 118, 138; 340/562

[56] References Cited

U.S. PATENT DOCUMENTS

| | | | |
|---|---|---|---|
| 3,384,789 | 5/1968 | Teshima | 340/562 |
| 3,462,692 | 8/1969 | Bartlett | 340/562 |
| 3,811,051 | 5/1974 | Merrell | 307/118 |

Primary Examiner—Stanley D. Miller, Jr.
Assistant Examiner—B. P. Davis
Attorney, Agent, or Firm—Vincent B. Ingrassia

[57] ABSTRACT

This relates to a circuit for delivering a linear voltage ($V_P$) which is inversely proportional to the capacitance of a pressure sensitive capacitive transducer. A constant current $I_O$ is alternately switched into a reference capacitor ($C_R$) and the transducer capacitor ($C_P$). When the voltage across $C_P$ reaches $V_P$, a flip-flop is toggled to direct current to $C_R$. When the voltage across $C_R$ reaches a reference voltage ($V_R$), the flip-flop is again toggled directing current to $C_P$. A duty cycle detector charges integrator capacitors until the feedback voltage $V_P$ is such as to render equal the charging times of $C_P$ and $C_R$.

9 Claims, 9 Drawing Figures

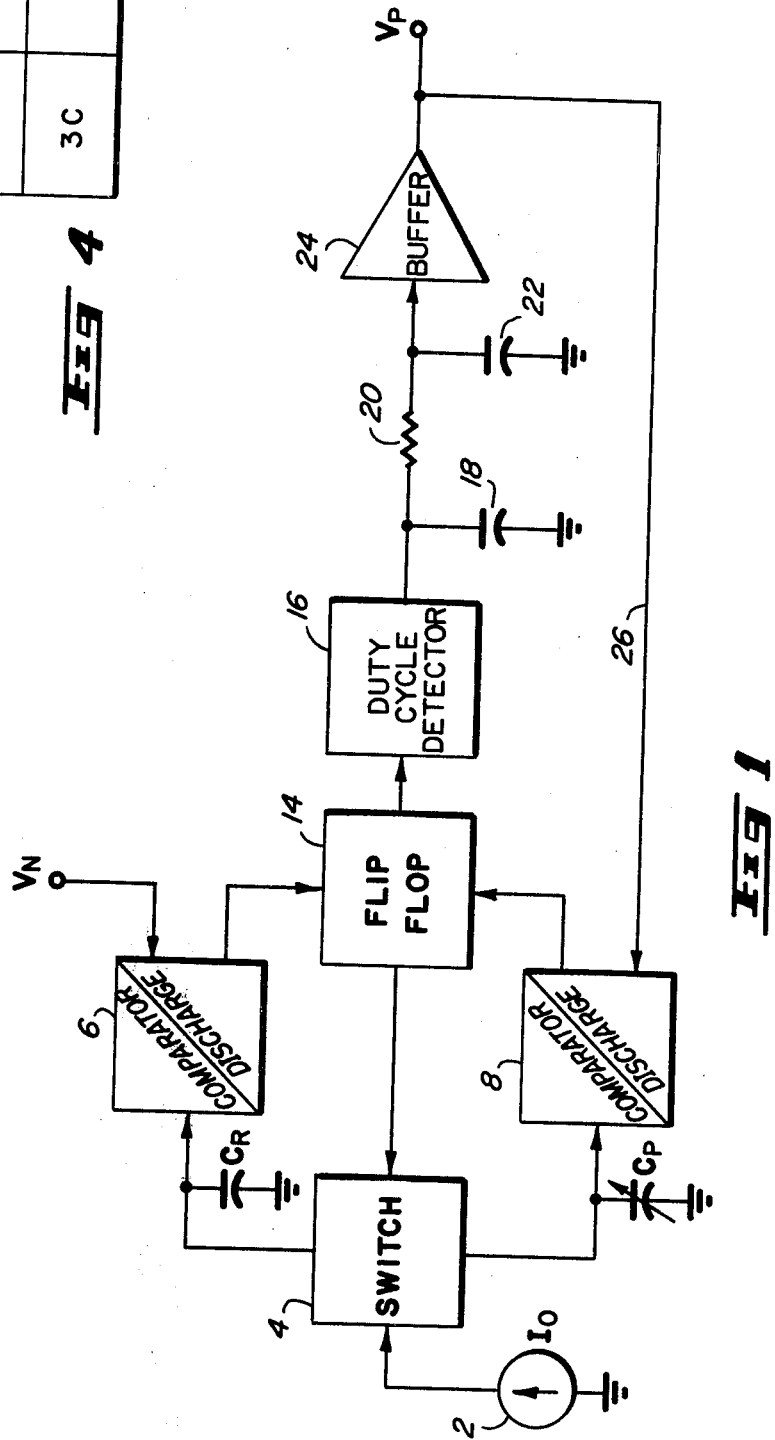

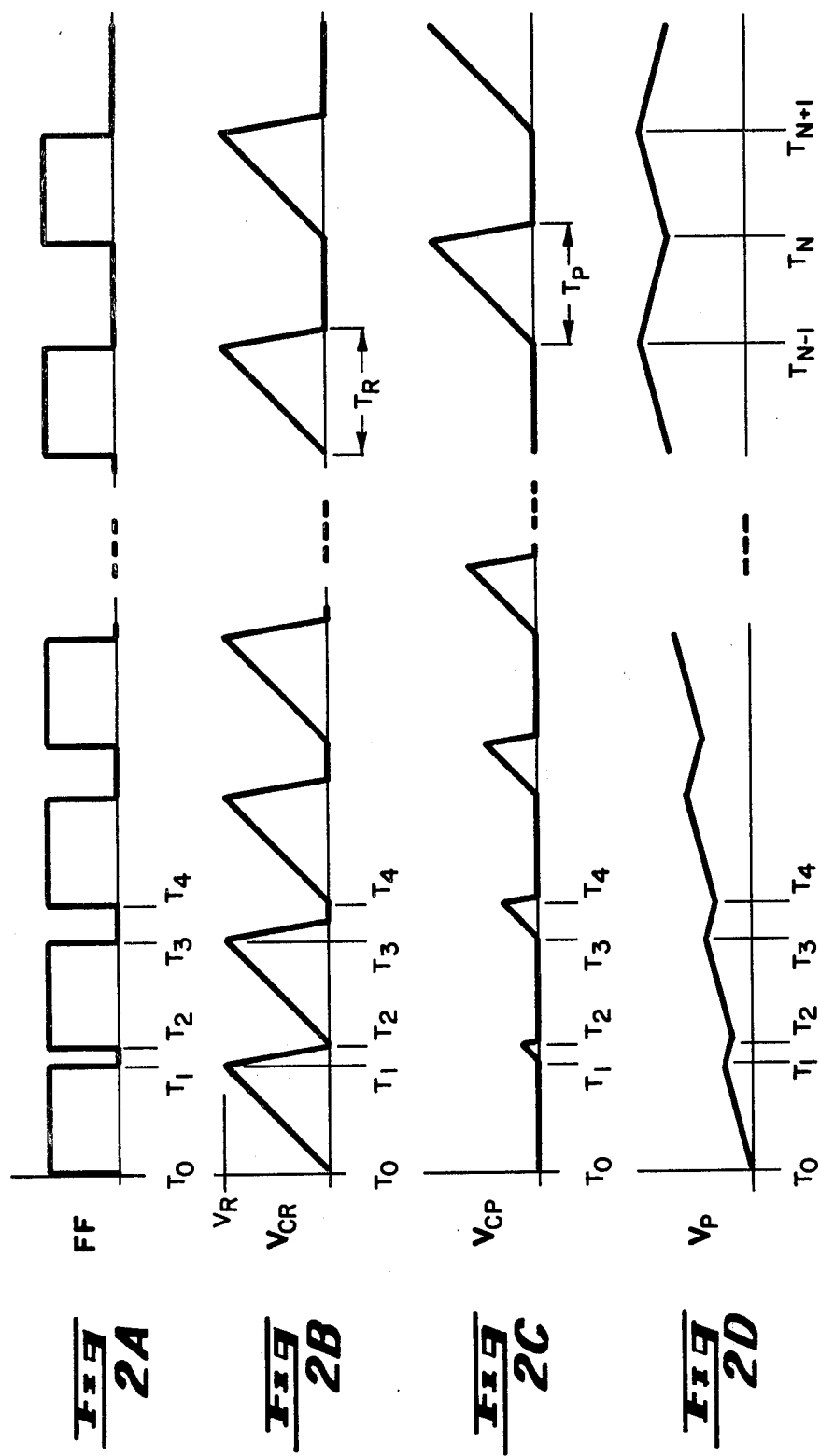

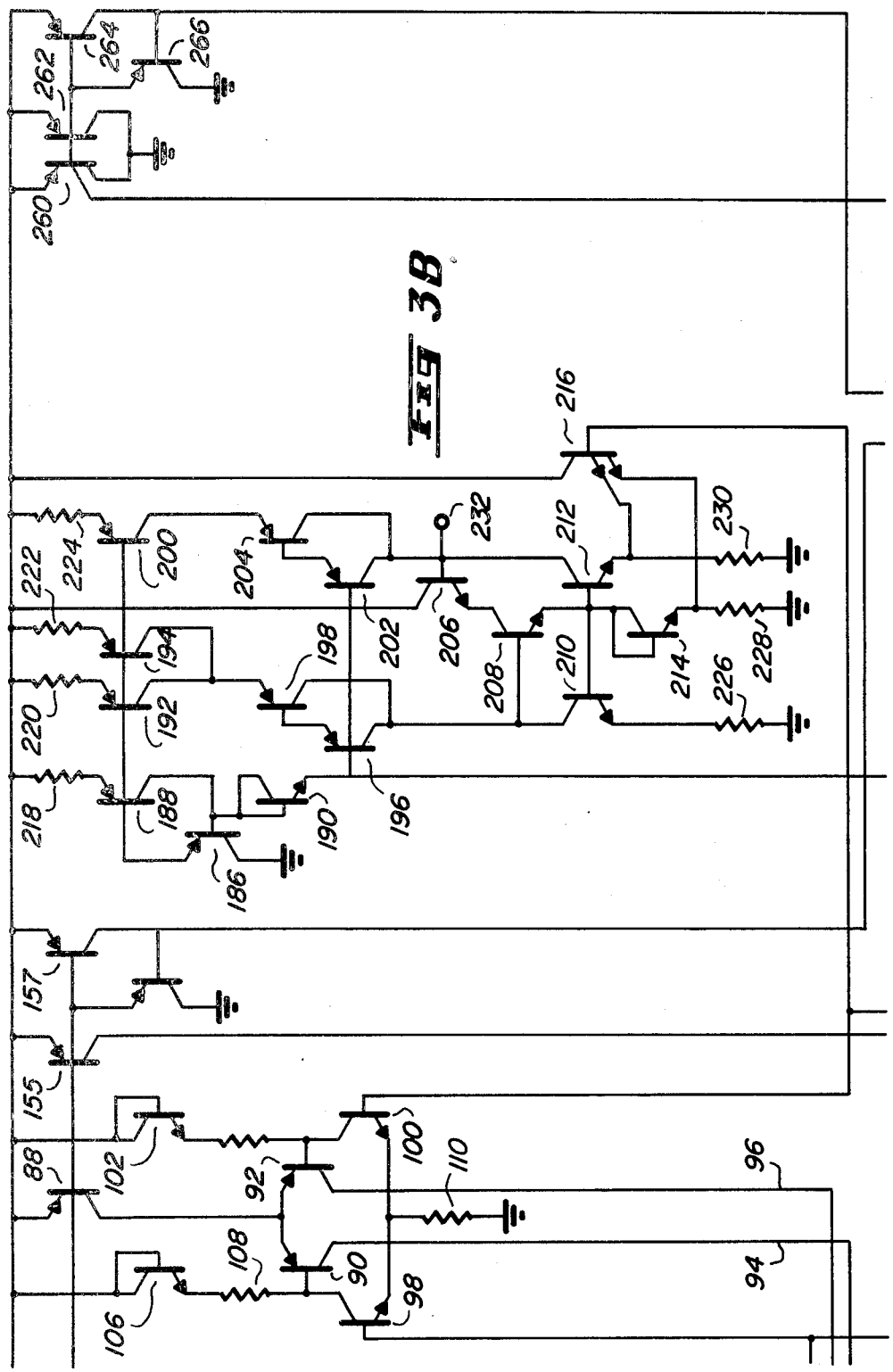

PRESSURE SENSITIVE TRANSDUCER CIRCUITS

BACKGROUND OF THE INVENTION

1. Field of the Invention

This invention relates generally to pressure sensing circuits, and more particularly to a monolithically integratable circuit for generating a linear voltage proportional to $1/C_P$ where $C_P$ is the capacitance of a pressure sensitive capacitive transducer.

2. Description of the Prior Art

Pressure sensors which utilize building-block integrated circuits to detect the frequency of two oscillators are known. The first oscillator generates a signal having a frequency which is proportional to the capacitance of a reference capacitor. To determine pressure, the signal is compared with the output of a second oscillator having a frequency which is proportional to the varying capacitance of a capacitive transducer. However, because this circuit is configured in an open loop configuration, it suffers from a substantial amount of inherent drift thus reducing its accuracy. Furthermore, due to the necessity of using a large number of components, the known arrangement is complicated, expensive, and does not lend itself to state-of-the-art thick-film technology.

SUMMARY OF THE INVENTION

It is an object of the present invention to provide an improved pressure sensing apparatus.

It is a further object of the invention to provide a circuit for generating a linear voltage inversely proportional to the capacitance of a variable capacitor.

It is yet another object of the invention that a closed loop system be employed to reduce drift and thus improve accuracy.

Finally, it is an object of the invention to provide a pressure sensing apparatus which is monolithically integrable and lends itself to thick film technology.

According to a broad aspect of the invention there is provided an apparatus for generating a voltage which is inversely proportional to the capacitance of a variable capacitor, comprising: a reference capacitor, first means coupled to said reference capacitor and to said variable capacitor for alternately charging and discharging said reference capacitor and said variable capacitor, and second means coupled to said first means for generating a feedback voltage at which said variable capacitor discharges, said feedback voltage attaining a magnitude inversely proportional to the capacitance of said variable capacitor.

According to a further aspect of the invention there is provided an integrated circuit for use in conjunction with an external power supply, external reference and transducer capacitors and external capacitive integrator to form a pressure sensing circuit, said integrated circuit comprising: first means for alternately charging and discharging said reference capacitor and said transducer capacitor, and second means coupled to said first means for producing in said integrator a feedback voltage at which said transducer capacitor discharges, said feedback voltage being inversely proportional to the capacitance of said transducer capacitor.

According to a yet further aspect of the invention there is provided a method for generating a voltage which is inversely proportional to the capacitance of a variable capacitor, comprising: directing a charging current to a reference capacitor for charging said reference capacitor, charging a capacitive integrator during the time said reference capacitor is being charged, discharging said reference capacitor when its voltage reaches a predetermined value, directing said charging current to a variable capacitor to charge said variable capacitor, discharging said capacitive integrator during the charging time of said variable capacitor, and discharging said variable capacitor when its voltage reaches the voltage stored in said capacitive integrator, said stored voltage being inversely proportional to the capacitance of said variable capacitor.

The above and other objects, features and advantages of the present invention will be more clearly understood from the following detailed description taken in conjunction with the accompanying drawings, in which:

BRIEF DESCRIPTION OF THE DRAWINGS

FIG. 1 is a block diagram of a first embodiment of the inventive pressure sensing circuit;

FIGS. 2a–2d are signal waveforms appearing at various points in the apparatus shown in FIG. 1;

FIGS. 3a–3d are detailed schematic diagrams of the apparatus shown in FIG. 1.

DESCRIPTION OF THE PREFERRED EMBODIMENTS

Figure 3A:
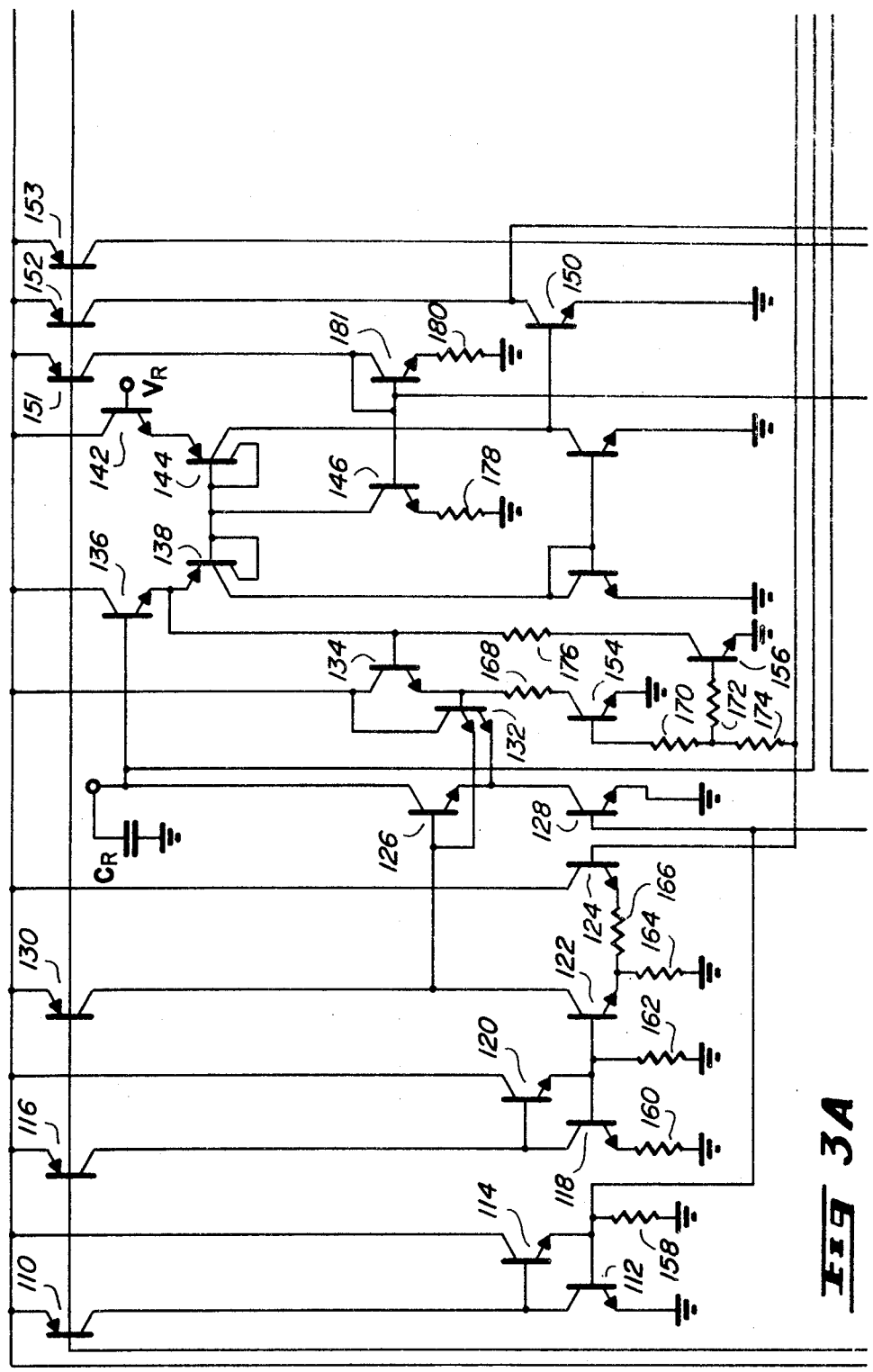

Referring to FIG. 1, a constant current source 2 generates a current $I_0$ which is alternately switched by switch 4 to a reference capacitor $C_R$ coupled between the input of comparator/discharge circuit 6 and the zero point of the circuit and to a pressure sensitive capacitive transducer having a capacitance $C_P$ which varies with pressure coupled between comparator/discharge circuit 8 and the zero point of the circuit. Each of circuits 6 and 8 has an output coupled to flip-flop 14 to toggle it. Flip-flop 14 in turn has outputs coupled to switch 4. A second output of flip-flop 14 is applied to duty cycle detector which serves as a current switch for an integrator comprising resistor 20 and capacitors 18 and 22. Detector 16 determines whether charge should be stored in or removed from the integrator. In addition to storing charge, the integrator reduces ripple in the signal supplied to buffer 24, which may be an operational amplifier configured for unity gain. Buffer 24 creates a high impedance node to the integrator to prevent charge loss. The output of buffer 24 is the desired voltage $V_P$ which is proportional to $1/C_P$. This voltage is fed back to comparator/discharge circuit 8 while a reference voltage $V_R$ is supplied to comparator/discharge circuit 6.

The above described pressure measuring apparatus utilizing the single flip-flop oscillator operates as follows. When flip-flop 14 is in a first state (e.g. high), the current $I_0$ is routed via switch 4 to capacitor $C_R$. When comparator 6 determines that the voltage across reference capacitor $C_R$ is substantially equal to the reference potential $V_R$, flip-flop 14 is toggled to a second state (e.g. low), and capacitor $C_R$ is discharged. During the time that flip-flop 14 was in its first state, a voltage was being accumulated in the integrator capacitors 18 and 22 via duty cycle detector 16 to produce the voltage $V_P$. This voltage after buffering is fed back to comparator 8.

At the time flip-flop 14 is toggled and capacitor $C_R$ begins to discharge ($t_1$ in FIGS. 2a–d), switch 4 reroutes the current $I_0$ to capacitor $C_P$ which begins to charge. At the same time, the integrator capacitors 18 and 22 begin to discharge at a rate equivalent to that with which they are charged. When the voltage across $C_P$ becomes substantially equal to $V_P$, flip-flop 14 is again toggled re-routing current $I_0$ back to $C_R$ (time $t_2$ in FIGS. 2a-d) and $C_P$ is discharged. It should be noted that at this point $V_P$ is substantially smaller than $V_R$, and therefore integrator capacitors 18 and 22 will have been charged to a greater extent than they have been discharged resulting in a residual $V_P$ when current $I_0$ is switched back to $C_R$.

During the next cycle, integrator capacitors 18 and 22 are again charged during the time it takes $C_R$ to charge to $V_R$ thus increasing $V_P$. Thus, when current $I_0$ is again switched to $C_P$ ($t_3$ is FIGS. 2a-d), it will take longer for $C_P$ to charge to $V_P$ ($t_4$ in FIGS. 2a-d). As a result, filter capacitors 18 and 22 will discharge for a longer time than they did during the first cycle; however, their discharge time is still shorter than their charging time resulting in a still greater increase in $V_P$. This process will continue during subsequent cycles until a steady-state condition is reached wherein $\tau C_R = \tau C_P$ since the current into the integrator is equivalent to that out of the integrator.

The equations for $\tau C_R$ and $\tau C_P$ are:

$$\tau_P = (C_P/I_0)V_P \quad (1)$$

$$\tau_R = (C_R/I_0)V_R \quad (2)$$

For $\tau_P = \tau_R \neq$ $$(C_P/I_0)V_P = (C_R/I_0)V_R$$

or $$V_P = (C_R/C_P)V_R \quad (3)$$

Thus, the desired voltage ($V_P$) proportional to $1/C_P$ has been achieved.

FIGS. 2a, 2b, 2c and 2d are waveforms illustrating the above described process. FIG. 2a shows the output of flip-flop 14 which, when high, causes $C_R$ to be charged and when low causes $C_P$ to be charged. That is, from $t_0$ to $t_1$, $C_R$ is charged (FIG. 2b) and from $t_1$ to $t_2$ $C_P$ is charged (FIG. 2c). During time $t_1-t_2$, $C_R$ is discharged (FIG. 2b). Referring to FIG. 2d, during time $t_0-t_1$, the filter capacitors are charged, and during $t_1-t_2$ they are discharged.

As above described, the length of time the filter capacitors are discharged increases for each cycle until a steady state condition is reached i.e. $\tau_R = \tau_P$ (FIGS. 2b and 2c). Initially, however, $t_3-t_4$ is greater than $t_1-t_2$ and so on. This is due to the progressive increase in $V_P$. When a steady state condition has been reached, the charge and discharge times of the filter capacitors are substantially equal; i.e. $t_n - t_{n-1} = t_{n+1} - t_n$.

Figure 3C:
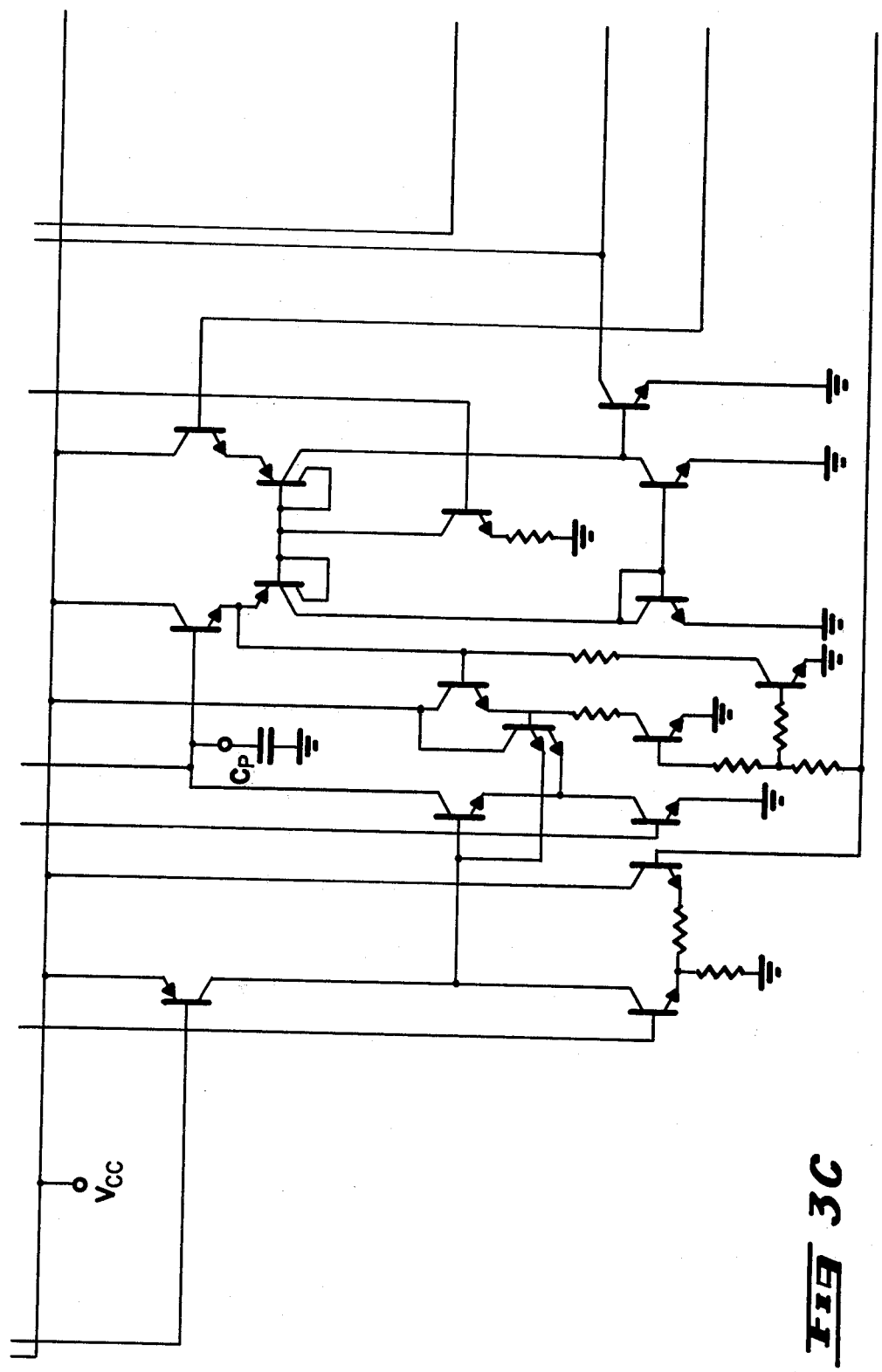
Figure 3D:
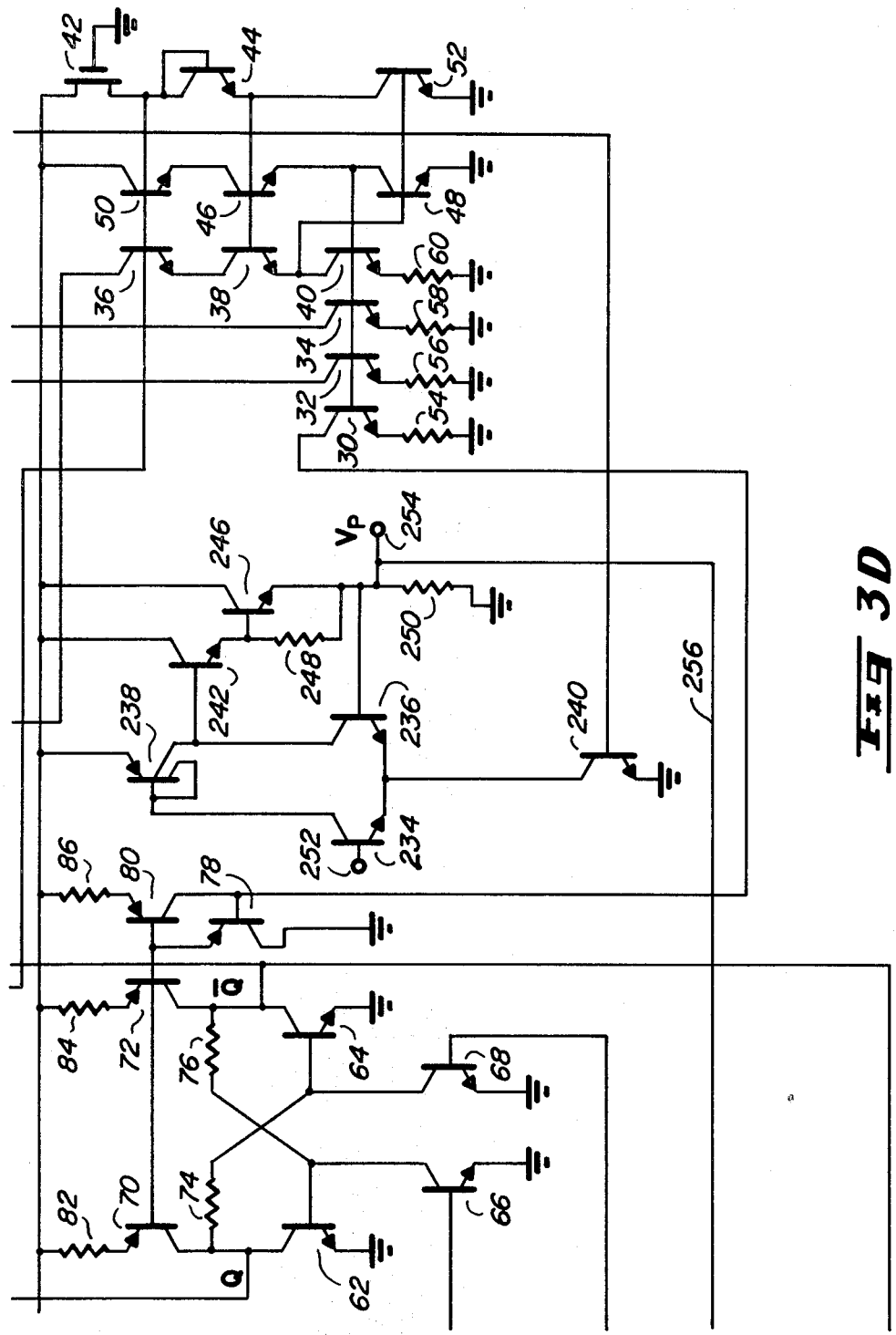

FIGS. 3a-3d are detailed schematic diagrams of the inventive pressure sensing apparatus shown in FIG. 1. FIG. 4 illustrates the proper orientation of FIGS. 3a-3d. Symmetry is used as much as possible throughout the circuit to reduce circuit induced errors such as timing errors and comparator offset voltages. Thus, symmetry exists between comparators/discharge circuits 6 and 8 (FIG. 1), and symmetry is inherent in the flip-flop. The current source 2 is alternately switched to the reference capacitor $C_R$ and the transducer capacitor by means of a symmetric switch 4 (FIG. 1).

As stated previously, the circuit includes a single flip-flop oscillator, and a current $I_O$ is alternately switched into $C_R$ or $C_P$ depending on the state of the flip-flop. When the capacitor voltage $V_{CP}$ reaches its associated comparator's reference $V_P$, the flip-flop is toggled switching $I_O$ into $C_R$ and discharing $C_P$. Capacitor $C_R$ then charges until the voltage across it ($V_{CR}$) reaches a reference voltage $V_R$ at which time it discharges and the cycle is repeated. Voltage $V_R$ is generated by an external source, and $V_P$ is the feedback voltage of the circuit. When enabled by the flip-flop, the duty cycle detector (16 in FIG. 1) charges an integrator until a feedback voltage $V_P$ is reached which renders the charging times of $C_P$ and $C_R$ equal or $\tau_R = \tau_P$. An isolation amplifier provides a high impedance load to the integrator to prevent charge loss and provides the required drive for an output and the $C_P$ comparator.

Referring to FIG. 3, a biasing current comprising transistors 30, 32, 34, 36, 38, 40, 42, 44, 46, 48, 50 and 52 and resistors 54, 56, 58 and 60 produce the currents required by the remainder of the circuit. The structure and operation of this circuit is fully described in U.S. patent application No. 882,710 entitled Reference Circuit for Providing a Plurality of Regulated Currents Having Desired Temperature Characteristics and assigned to the assignee of the present invention.

A standard set-reset type flip-flop comprised of transistors 62, 64, 66 and 68 and resistors 74 and 76 is employed in the circuit. Transistors 66 and 68 are controlled by the reference comparator and transducer comparator respectively which monitor $V_{CR}$ and $V_{CP}$. Transistors 70 and 72 supply current to the flip-flop (e.g. 500 ua each) and provide the required load. Transistors 62 and 64 are alternately switched on and off. For example, if transistor 62 is off, current from transistor 70 will flow through resistor 74 turning transistor 64 on and driving it into deep saturation. If transistor 68 is now turned on by the transducer comparator, current will be diverted from the base of transistor 64 and since transistor 66 is off, current will flow through resistor 76 to the base of transistor 62 turning it on. A "HIGH" output is produced by the voltage drops in resistors 74 and 76 when transistors 62 and 64 are off respectively.

Transistors 70, 72, 78 and 80 produce the required current (e.g. 500 ua) from currents supplied by the biasing circuit (e.g. 50 ua from transistor 30). Resistors 82, 84 and 86 are biasing resistors, and transistor 78 is a substrate transistor which reduces base current errors in the current mirror configuration.

The reference current $I_O$ is developed by a current mirror string including transistors 88, 110, 116, 130, 151, 152, 153 and 155. The $V_{BE}$ for the current string is established by current flowing through transistor 157. The current $I_O$ is switched through transistors 90 and 92 to $C_P$ and $C_R$ respectively, each of these transistors having an emitter coupled to the collector of transistor 88. Switching transistors 90 and 92 have bases coupled to collectors of transistors 98 and 100 respectively which in turn have bases coupled to flip-flop transistors 62 and 64. Transistors 98 and 100 are configured in a differential amplifier mode and their bases are switched simultaneously by the flip-flop to obtain very fast switching times. The combinations of transistors and resistors 102, 104 and 106, 108 are loads for pulling current out of the bases of the switching transistors.

Since both comparators are identical, only the reference comparator will be described in detail. Transistors 110, 112 and 114 and transistors 116, 118 and 120 establish the currents at the collectors of transistors 128 and 122 respectively; e.g. 150 ua and 100 ua. Transistor 130, coupled to $V_{CC}$, supplies, for example 50 ua. When $I_O$ is charging the reference capacitor $C_R$, the voltage on the base of transistor 124 which is coupled to the flip-flop is low and thus permits transistor 122 to sink the current developed by transistor 130 thus maintaining transistor 126 whose base is coupled to the collector of transistor 130 in an off condition. Transistor 126 which is utilized to discharge capacitor $C_R$ is operated in the inverse mode to reduce shunt capacitance. This configuration produces a collector to base breakdown voltage of approximately 7 volts which is compensated for by transistors 132 and 134 which maintain the base and emitter of transistor 126 three times $V_{be}$ below the potential of capacitor $C_R$.

As the voltage across capacitor $C_R$ reaches the reference voltage $V_R$ (coupled to the base of transistor 142), the differential comparator comprising transistors 136, 138, 140, 142, 144, 146 and 148 shuts off transistor 150 thus permitting the current from transistor 152 to drive transistor 66 and thus toggle the flip-flop. Transistors 150 and 152 present a high impedance out of the comparator and provides increased control, increased speed and reduces timing errors in the circuit.

When the flip-flop changes state, the current $I_O$ is switched to charge $C_P$ and a high level is applied to transistors 124, 154 and 156. The high on transistor 124 shuts off transistor 122 as these two are operated in a differential amplifier configuration, and the current from transistor 130 turns transistor 126 on thus discharging capacitor $C_R$. Transistors 154 and 156 discharge the junction capacitances of transistors 134 and 132 allowing the capacitor voltage $V_{CR}$ to fall. This process is repeated for each capacitor; i.e. $C_R$ and $C_P$.

Resistors 158 and 162 are used in a mirror configuration to increase the stability of the mirror. Resistors 170, 172 and 174 are utilized to prevent transistors 154 and 156 from hogging the available base drive when transistors 154 and 156 go into saturation. Resistors 168 and 176 are loads for transistors 154 and 156, and resistors 178 and 180 improve current matching in the current mirror formed from transistors 146 and 181. Finally, transistors 146, 151 and 181 set up the current source for the comparator.

The output of transistor 64 in the flip-flop is coupled to the base of transistor 216 for controlling the duty cycle detector which comprises transistors 186, 188, 190, 192, 194, 196, 198, 200, 202, 204, 206, 208, 210, 212, 214 and 216 and resistors 218, 220, 222, 224, 226, 228 and 230. Transistors 186 and 188 set up the required input currents (e.g. 50 ua) for current mirror transistors 188, 192, 194 and 200. Transistors 192 and 194 are coupled in parallel so as to develop a current 2I with respect to the current I flowing through transistor 200. The current 2I is applied to a mirror circuit consisting of transistors 210 and 212 so that the current discharging the filter section is twice that of the charging current. Since transistor 216 is switching the current 2I on and off in response to the flip-flop output, the output voltage $V_P$ will track until equal charging times for $C_R$ and $C_P$ are developed. Transistors 196, 198 and 202, 204 are used in a Darlington configuration to improve the output impedance of the I and 2I current sources.

Transistor 208 is utilized to improve the operation of the current mirror (transistors 210 and 212). This represents a base current cancelling scheme to render the discharge current (collector current of transistor 212) more equal to the collector current of transistor 210. However, there still exists an error between the 2I current flowing through the Darlington pair (196, 198) and that flowing through transistor 212. This error corresponds to the base current of transistor 208. To compensate for this, transistor 206 is included to generate a base current which loads the collector of transistor 212 so that the current therethrough matches the current in transistor 210.

Transistor 214 is connected as a diode and serves to reduce the value of resistor 228 to, for example, 50 K ohms which improves the operation of the current mirror. Resistors 226 and 230 (e.g. 5 KΩ) coupled to the emitters of transistors 210 and 212 respectively improve matching of the current mirror and increase the output impedance of transistors 210 and 212. Were it not for the inclusion of transistor 214, resistor 228 would have to be much larger.

Transistor 212 is turned off by transistor 216 operating in a basic differential amplifier mode such that whenever the base voltage of transistor 216 is higher than that of the bases of transistors 210 and 212, transistor 212 will be turned off. Thus, whenever the flip-flop forces a high voltage on the base of transistor 216, transistor 212 will turn off permitting current I to flow via terminal 232 into the filter (shown in FIG. 1). When the base of transistor 216 is low, transistor 212 turns on and pulls 2I (twice the charging current I). That is, when transistor 212 turns on, it will pull a current I (50 ua) through transistors 202 and 204 and will pull a current I (an additional 50 ua) out of the filter.

Resistors 218, 220, 222 and 224 increase the output impedances of transistors 188, 192, 194 and 200 and create a more perfect current match. Transistor 186 is a base current cancelling transistor for a standard current mirror, and transistor 190 lowers the voltage required for proper operation of the Darlington buffers (transistors 196, 198 and 202, 204).

An isolation amplifier (transistors 234, 236, 238, 240, 242, 246 and resistors 248 and 250) is coupled to the output of the filter (FIG. 1) via terminal 252 and is used as an emitter follower stage to reduce output loading on the duty cycle detector. Transistors 260, 262, 264 and 266 function as a tail current source for supplying the current mirror 258 and 240 which generates the tail current for the isolation amplifier. If the base of transistor 236 falls below the base voltage of transistor 234, Darlington pair 242 and 246 will function to raise the base voltage of transistor 236. Resistor 248 is a biasing resistor, and resistor 250 serves to stabilize the operational amplifier. The above referred to feedback voltage $V_P$ is available at terminal 254 and is fed back to the transducer comparator on conductor 256.

While a particular embodiment of the invention has been shown and described, it will be understood that the invention is not limited thereto since many modifications may be made therein and will become apparent to those skilled in the art.

We claim:

1. An apparatus for generating a voltage which is inversely proportional to the capacitance of a variable capacitor, comprising:
   a reference capacitor;
   first means coupled to said reference capacitor and to said variable capacitor for alternately charging and discharging said reference capacitor and said variable capacitor; and
   second means coupled to said first means for generating a feedback voltage at which said variable capacitor discharges, said feedback voltage attaining a magnitude inversely proportional to the capacitance of said variable capacitor;

said first means comprising:

third means for alternately directing current to said reference capacitor and said variable capacitor;

first comparing means coupled to said third means and to said reference capacitor for altering the state of said third means when the voltage across said reference capacitor reaches a predetermined value whereby said reference capacitor is discharged and said current is directed to said variable capacitor; and second comparing means coupled to said third means and to said variable capacitor for altering the state of said third means when the voltage across said variable capacitor reaches said feedback voltage whereby said variable capacitor is discharged and said current is directed to said reference capacitor.

2. An apparatus according to claim 1 wherein said third means comprises:

a current switch having first and second outputs coupled to said reference capacitor and said variable capacitor respectively; and a bistable device having inputs coupled to said first and second comparing means and having an output coupled to said current switch.

3. An apparatus according to claim 2 wherein said bistable device is a flip-flop.

4. An apparatus according to claim 1 wherein said second means comprises:

charge storing means; and fourth means for directing current into said charge storing means when said reference capacitor is being charged and for extracting current from said charge storing means when said variable capacitor is being charged.

5. An apparatus according to claim 4 wherein said charge storing means is a capacitive integrator.

6. An integrated circuit for use in conjunction with an external power supply, external reference and transducer capacitors and an external integrator to form a pressure sensing circuit, said integrated circuit comprising:

first means for alternately charging and discharging said reference capacitor and said transducer capacitor; and second means coupled to said first means for producing in said integrator a feedback voltage at which said transducer capacitor discharges, said feedback voltage being inversely proportional to the capacitance of said transducer capacitor;

said first means comprising:

third means for alternately directing current to said reference capacitor and said transducer capacitor;

a first comparator coupled to said third means for altering the state of said third means when the voltage across said reference capacitor reaches a predetermined value whereby said reference capacitor is discharged and said current is directed to said transducer capacitor; and a second comparator coupled to said third means for altering the state of said third means when the voltage across said transducer capacitor reaches said feedback voltage whereby said transducer capacitor is discharged and said current is directed to said reference capacitor.

7. An integrated circuit according to claim 6 wherein said third means comprises:

a current switch; and a bistable device having inputs coupled to said first and second comparators and having an output coupled to said current switch.

8. An integrated circuit according to claim 7 wherein said bistable device is a flip-flop.

9. An apparatus according to claim 6 wherein said second means comprises charging means for directing current into said filter when said reference capacitor is being charged and for extracting current from said filter when said transducer capacitor is being charged.

* * * * *